United States Patent
Medi et al.

(10) Patent No.: US 7,831,540 B2
(45) Date of Patent: Nov. 9, 2010

(54) EFFICIENT UPDATE OF BINARY XML CONTENT IN A DATABASE SYSTEM

(75) Inventors: Vijay Medi, Sunnyvale, CA (US); Sivasankaran Chandrasekar, Palo Alto, CA (US); Nipun Agarwal, Santa Clara, CA (US)

(73) Assignee: Oracle International Corporation, Redwood Shores, CA (US)

(*) Notice: Subject to any disclaimer, the term of this patent is extended or adjusted under 35 U.S.C. 154(b) by 398 days.

(21) Appl. No.: 11/924,556

(22) Filed: Oct. 25, 2007

(65) Prior Publication Data

US 2009/0112890 A1     Apr. 30, 2009

(51) Int. Cl.
*G06F 7/00*     (2006.01)
*G06F 17/00*    (2006.01)

(52) U.S. Cl. .................. 707/601; 707/605; 715/239
(58) Field of Classification Search .................. None
See application file for complete search history.

(56) References Cited

U.S. PATENT DOCUMENTS

| | | | |
|---|---|---|---|
| 6,018,747 A | 1/2000 | Burns et al. | |
| 6,414,610 B1 | 7/2002 | Smith | |
| 6,598,055 B1 | 7/2003 | Keesey et al. | |
| 6,671,853 B1 | 12/2003 | Burkett et al. | |
| 6,883,137 B1 | 4/2005 | Girardot et al. | |
| 6,941,510 B1 * | 9/2005 | Ozzie et al. | 715/234 |
| 7,013,425 B2 | 3/2006 | Kataoka | |
| 7,031,956 B1 | 4/2006 | Lee et al. | |
| 7,080,094 B2 | 7/2006 | Dapp et al. | |
| 7,090,318 B2 | 8/2006 | Brown | |
| 7,143,397 B2 | 11/2006 | Imaura | |
| 7,464,082 B2 | 12/2008 | Weiss | |
| 2001/0037346 A1 | 11/2001 | Johnson | |

(Continued)

FOREIGN PATENT DOCUMENTS

WO    WO 03107576    12/2003

(Continued)

OTHER PUBLICATIONS

Lazy XML Updates: Laziness as a Virtue of Update and Structural Join Efficiency, Catania et al, SIGMOD 2005 Jun. 14-16, 2005.*

(Continued)

*Primary Examiner*—Pierre M Vital
*Assistant Examiner*—Augustine Obisesan
(74) *Attorney, Agent, or Firm*—Hickman Palermo Truong & Becker LLP

(57) ABSTRACT

Various techniques are described hereafter for improving the efficiency of updating XML documents in a content repository, such as a database system. Specifically, techniques are described for updating an XML document by dynamically merging a stream of XML data from the document with update information. Techniques are also described for efficient validation of XML documents. Because of the manner of the updates, specifically because the XML data being updated is in the form of a stream, the database system validates only those portions of the stream of XML data that have been updated. In the alternative, the database system validates that portion of the XML data that is associated with the parent node of the portion of XML data that has been updated.

24 Claims, 4 Drawing Sheets

U.S. PATENT DOCUMENTS

| | | | |
|---|---|---|---|
| 2002/0075514 A1* | 6/2002 | Wright et al. | 358/1.15 |
| 2002/0111965 A1* | 8/2002 | Kutter | 707/513 |
| 2003/0046317 A1* | 3/2003 | Cseri et al. | 707/513 |
| 2003/0093626 A1 | 5/2003 | Fister | |
| 2004/0060006 A1* | 3/2004 | Lindblad et al. | 715/513 |
| 2004/0143791 A1 | 7/2004 | Ito et al. | |
| 2005/0033733 A1 | 2/2005 | Shadmon et al. | |
| 2005/0044113 A1* | 2/2005 | Manikutty et al. | 707/104.1 |
| 2005/0050054 A1 | 3/2005 | Clark et al. | |
| 2005/0108209 A1* | 5/2005 | Beyer et al. | 707/3 |
| 2005/0114316 A1 | 5/2005 | Fontoura et al. | |
| 2005/0187973 A1* | 8/2005 | Brychell et al. | 707/104.1 |
| 2005/0278616 A1 | 12/2005 | Eller | |
| 2006/0021246 A1 | 2/2006 | Schulze et al. | |
| 2006/0031757 A9* | 2/2006 | Vincent | 715/513 |
| 2006/0143340 A1 | 6/2006 | Labar | |
| 2006/0167912 A1 | 7/2006 | Coulson et al. | |
| 2006/0195783 A1* | 8/2006 | Davis et al. | 715/513 |
| 2006/0277179 A1 | 12/2006 | Bailey | |
| 2007/0079234 A1* | 4/2007 | McCollum et al. | 715/513 |
| 2007/0271305 A1 | 11/2007 | Chandrasekar et al. | |
| 2009/0150412 A1 | 6/2009 | Idicula et al. | |

FOREIGN PATENT DOCUMENTS

| | | |
|---|---|---|
| WO | WO 2006026534 | 3/2006 |

OTHER PUBLICATIONS

Efficient Storage of XML data, Kanne et al, Dec. 13, 1999.*
An Efficient XML Index Technique with Relative Position Coordinate, Kim et al, Dept. of Computer Science, Seoul, South Korea, WSEAS Transactions on Information Science and Applications. vol. 2, No. 4, pp. 373-379. Apr. 2005.*
Dynamically updating XML Data; Numbering Scheme Revisited, Yu et al, Internet and Web Information Systems, vol. 8, pp. 5-26, 2005.*
The Extended XQL for Querying and Updating Large XML Databases, Wong et al, DocEng'01, Nov. 9-10, 2001.*
Updates and Incremental Validation of XMl Documents, Bouchou et al, LNCS 2921, pp. 216-232, 2004.*
A delta Format for XML: Identifying Changes in XML Files and Representing the Changes in XML, La Fontaine et al, 2001.*
PCT/US2007/010163, Notification of Transmittal of the International Search Report and the Written Opinion of the International Searching Authority, Oct. 12, 2007, 12 pages.
Bayardo et al., "Optimizing encoding: An evaluation of binary xml encoding optimizations for fast stream based xml processing", May 2004, Proceedings of the 13th international conference on World Wide Web WWW 04', Publisher ACM press, 7 pages.
Liu et al., "XML retrieval: Configurable indexing and ranking for XML information retrieval", Jul. 2004, Proceedings of the 27th annual international ACM SIGIR conference on Research and development in information retrieval SIGIR 04', Pulished by ACM press, 12 pages.
Liefke et al., "Xmill: an efficient compressor for XML data", May 2000, ACM SIGMOD Record, Proceedings of the 2000 ACM SIGMOD international conference on Management of data SIGMOD 00', vol. 29 Issue 2, Publisher: ACM Press, 12 pages.
Min et al., "XML Indexing and compression: XPRESS: a queriable compression for XML data", Jun. 2003, Proceedings of the 2003 ACM SIGMOD international conference on Management of data SIGMOD 03', Published by ACM Press, 8 pages.
Zou et al., "XML Processing: Ctree: a compact tree for indexing XML data" Nov. 2004, Proceedings of the 6th annual international workshop on Web information and data management WIDM 04', Published by ACM Press, 10 pages.
"WAP Binary XML Content Format" downloaded from the Internet Nov. 9, 2007 < http://www.w3.org/TR/wbxml/ > 15 pages.
"3 Using Oracle XML DB" downloaded from the Internet Nov. 9, 2007 < http://download.oracle.com/docs/cd/B28359_01/appdev.111/b28359/xdb03usg.htm > 63 pages.
"What's New in the XDK?" downloaded from the Internet Nov. 9, 2007 < http://download.oracle.com/docs/cd/B28359_01/appdev.111/b28394/whatsnew.htm > 3 pages.
"20 Using the XML Schema Processor for C" downloaded from the Internet Nov. 9, 2007 < http://download.oracle.com/docs/cd/B28359_01/appdev.111/b28394/adx_c_sproc.htm > 10 pages.
"4 XML Parsing for Java" downloaded from the Internet Nov. 9, 2007 < http://download.oracle.com/docs/cd/B28359_01/appdev.111/b28394/adx_j_parser.htm > 42 pages.
"4 XMLType Operations" downloaded from the Internet Nov. 9, 2007 < http://download.oracle.com/docs/cd/B28359_01/appdev.111/b28369/xdb04cre.htm > 29 pages.
Zhang, et al., "TDX: A High Performance Table-driven XML Parser", In proceedings of the 44th annual (ACM) Southeast Regional Conference, Mar. 2006, ACM, 6 pp.
Balmin et al., "Incremental Validation of XML Documents", ACM Trans. Database System, Dec. 24, 2004, 42 pp.

* cited by examiner

200

<1><2>ABEL-20021127121040897PST</2><3><4*0><5>ZLOTKEY</5></4>
<4*1><5>KING</5></4> . . . . </1>

EFFICIENT UPDATE OF BINARY XML CONTENT IN A DATABASE SYSTEM

RELATED APPLICATIONS

This application is related to the following applications, the content of which is incorporated by this reference for all purposes as if fully disclosed herein:

U.S. patent application Ser. No. 11/182,997, filed Jul. 14, 2005, entitled "Encoding Of Hierarchically Organized Data For Efficient Storage And Processing";

U.S. patent application Ser. No. 11/437,512, filed May 18, 2006, entitled "Efficient Piece-Wise Updates Of Binary Encoded Xml Data";

U.S. patent application Ser. No. 11/716,505, filed Mar. 8, 2007, entitled "Technique To Estimate The Cost Of Streaming Evaluation Of Xpaths" (hereinafter the "Streaming XPath Evaluation Application"); and U.S. patent application Ser. No. 11/729,943, filed Mar. 28, 2007, entitled "Validation Of XML Content In A Streaming Fashion" (hereinafter the "Streaming Validation Application").

FIELD OF THE INVENTION

The present invention relates to updating XML documents in a database system and, more specifically, to techniques for efficiently updating XML documents using streaming XML and techniques for efficiently validating the updated XML documents using piece-wise validation.

BACKGROUND

Increasingly, XML documents are being stored and managed within content repositories. These content repositories are typically based on a database system and offer file system abstractions such as foldering, access control, versioning, and protocol access.

At times, it is necessary to update XML documents stored within content repositories. A request to update an XML document stored in a content repository will indicate the position of the nodes targeted by the update. Nodes may also be called elements. One common way of indicating positions in an XML document is to use XPath.

XPath Expressions

XPath is a language for addressing XML documents that operates on the abstract, logical structure of an XML document, rather than its surface syntax. XPath gets its name from its use of a path notation, as in URLs, for navigating through the hierarchical structure of an XML document. The XPath data model is described in detail in Section 5 ("Data Model") of "XML Path Language (XPath)" (version 1.0), a W3C (World Wide Web Consortium) Recommendation dated 16 Nov. 1999.

The primary syntactic construct in XPath is the expression. XPath expressions are described in Section 3 ("Expressions") of "XML Path Language (XPath)" (version 1.0). One important kind of expression is a location path which indicates a set of nodes relative to a context node. The semantics of location paths are described in Section 2 ("Location Paths") of "XML Path Language (XPath)" (version 1.0).

DOM Trees

Once a request to update an XML document is received by a content repository, updating the XML document is typically accomplished by: (1) reading the XML document into computer memory, (2) updating the XML data within the XML document, and (3) either saving the updated XML document back to the content repository or using the updated XML document in some other way.

When an XML document is read into computer memory from a content repository, the document is typically represented using a type of tree structure such as the one provided by the document object model (DOM). More specifically, an XML document may be parsed into interconnected objects using the DOM, and the resulting DOM tree resides in computer memory. This DOM tree represents the parsed document as a node tree with a plurality of nodes. The DOM tree representation provides all information pertinent to every node represented therein, including information about the parent, sibling and child nodes of each node as well as all of the information pertinent to the data each node represents.

Accordingly, XML data is updated only after the entire DOM tree representing the XML data is built in computer memory. To update the XML data, the content repository must cause the DOM tree to be traversed to find every instance of the nodes targeted by the update. Once all of the target nodes are identified, the DOM tree is again traversed to update the target nodes.

Validation of DOM Trees

Many XML documents conform to a set pattern known as a schema. A schema is a set of rules, apart from the general rules of XML, that constrain the content of any XML document that conforms thereto. A schema can constrain the data and/or the structure of the XML document. Validating an XML document after it is updated can be important because many programs rely on the fact that an XML document based on a schema will still conform to the schema rules after changes have been made to the document.

In order to validate a DOM tree, the entire tree is traversed and compared to the appropriate schema. However, because validating a DOM tree can take too much time and too many resources, updates made using a DOM tree are generally not validated against any applicable schema.

Binary XML

The size of individual XML documents has been growing. XML documents can be as large as multi-megabytes and are expected to grow significantly over time. Furthermore, DOM trees built in computer memory are several times the size of the XML documents they represent. As XML documents grow, the DOM trees that represent them become more costly and inefficient to construct and traverse.

Binary XML is a compact binary representation of XML that was designed to reduce the size of XML documents, and is one format in which XML data can be stored in a database. Binary XML reduces the overall size of the XML document and its corresponding DOM tree, but does not eliminate the need to create and traverse a DOM tree in order to update and validate the XML document.

One of the ways binary XML compresses data is by representing strings, including tag names, with fixed binary replacement values ("tokens"). In one implementation of binary XML, a mapping is established between character strings and replacement values, where the character strings are tag names, and the replacement values are numbers. Such mappings are referred to herein as "translation information".

For example, consider an XML document PO1 that contains the following content:

```
<Purchase Order>
  <body>
    Important Data
  </body>
</Purchase Order>
```

PO1 includes the tag names "Purchase Order" and "body". To store PO1 in binary XML format, the tag name "Purchase Order" may be mapped to a token, "1", and the tag name "body" may be mapped to another token, "2". Typically, the tokens consume much less space than the corresponding strings. For example, the tag name "Purchase Order", which contains fourteen characters, may be assigned a token that takes less space to store than a single text character.

Once translation information has been created, XML documents may be stored in binary XML based on the translation information. For example, PO1 may be stored as <1><2> Important Data</2></1>. In typical implementations of binary XML, even the symbols (e.g., "<", ">", and "/") may be represented by binary replacement values.

To be meaningful to an application that requests PO1, <1><2> Important Data</2></1> would have to be translated back into:

```
<Purchase Order>
  <body>
    Important Data
  </body>
</Purchase Order>
```

To reconstruct the text of an XML document that has been stored in binary format, the translation information that was used to encode the XML document is available.

Streaming Validation

The Streaming Validation Application describes a system in which the validation of a stream of binary XML data is performed using events generated by the stream. For example, events may be generated marking the beginning or end of an element, the existence of an attribute, the content of an attribute or node, or any other pertinent information. The events generated by the stream of binary XML give a snapshot of the XML data contained in the stream. Given a knowledge of the schema definition on which the XML data is based, the events give sufficient information to validate the XML data. It is clearly desirable to provide further techniques to improve the speed, increase the efficiency, and reduce the memory consumption of binary XML validation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figures 1, 2:
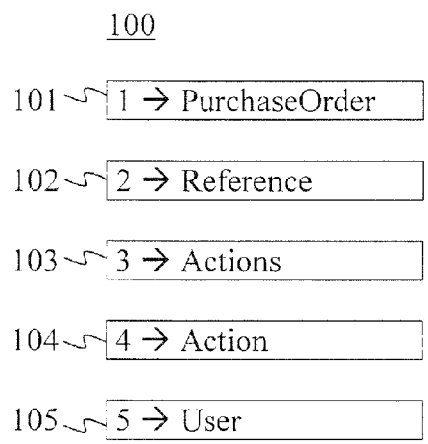
FIG. 1 is a block diagram of a set of mappings used to translate a string representation of XML to binary XML.
FIG. 2 is a representation of binary XML.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Various techniques are described hereafter for improving the efficiency of updating XML documents in a content repository, such as a database system. Specifically, techniques are described for updating an XML document by dynamically merging a stream of XML data from the XML document with update information. Once the stream of XML data has been merged with the update data, the merged stream is validated against any applicable schema. Because the XML document is updated in a streaming fashion, the overhead of creating a structure with the XML data, such as a DOM tree, is avoided by the database server. In one embodiment, the XML document is in binary XML form, thus saving computer memory space and database server resources. In such an embodiment, the update data is converted into binary XML form before it is merged with the XML document. It will be apparent to one of skill in the art that the techniques provided are not exclusive to the binary XML format.

Techniques are also described for efficient validation of XML documents. Because of the manner of the updates, specifically because the XML data being updated is in the form of a stream, the database system validates only those portions of the stream of XML data that have been updated. In the alternative, the database system validates that portion of the XML data that is associated with the parent node of the portion of XML data that has been updated. This piece-wise validation of the updates to the XML document also saves computer memory space and database resources.

Example XML Documents

For the purpose of explanation, examples shall be given hereafter with reference to the following example XML document PO2:

```
<PurchaseOrder>
  <Reference>ABEL-20021127121040897PST</Reference>
  <Actions>
    <Action>
      <User>ZLOTKEY</User>
    </Action>
    <Action>
      <User>KING</User>
```

```
        </Action>
    </Actions>
    ...
</PurchaseOrder>
```

As indicated above, PO2 is merely an example of an XML document. The techniques described herein are not limited to XML documents having any particular types, structure, or content. Examples shall be given hereafter of how such a document would be updated.

The Request

To update an XML document stored in a database system, a SQL query is used. Updating an XML document may be performed by issuing one or more SQL queries against the table in which the XML document resides. For example, a SQL query may be executed to update an XML document and write the updated document back to the database, or the SQL query may be executed to update the XML document and return it to the initiator of the query without writing the updated document to the database. It will be apparent to one skilled in the art that the techniques provided may be practiced to update an XML document without regard to whether or not the updated XML document is written back to the database.

A query of type SQL-UPDATE may be used when the ultimate purpose of the query is to write an updated version of the XML document to the database. The following example of such a query is based on the example XML document, PO2:

```
UPDATE xml_table SET po1_xml = UpdateXML(po1_xml,
    '/PurchaseOrder/Actions/Action[1]/User', '<User>JAMES</User>');
```

This query is designed to replace the previous value of the User child node of the second Action node in the Actions array of PO2, "KING", with the new value "JAMES" and then save the updated document back to the database.

Furthermore, a query of type SQL-SELECT may be used to return an updated XML document to the client without saving the updated document back to the database. The following example of such a query is also based on the example XML document, PO2:

```
SELECT UpdateXML(po1_xml,
    '/PurchaseOrder/Actions/Action[1]/User', '<User>JAMES</User>')
    FROM xml_table;
```

This query is designed to replace the previous value of the User child node of the second Action node in the Actions array of PO2, "KING", with the new value "JAMES" and return that updated XML document to the client, without writing the updated XML document to the database.

The SQL query examples provided both use the function UpdateXML to modify the specified XML document. However, it will be apparent to one skilled in the art that the techniques provided may be practiced without regard to the function used to modify the XML document. For example, the update may be accomplished using the following SQL functions: InsertChildXML, InsertXMLBefore, AppendChildXML, and DeleteXML.

The Stream

When an XML document is updated, it is read into computer memory so that the structure of the XML data in the XML document can be manipulated. According to one embodiment, the XML document is read into computer memory as a stream of binary XML data.

Recall the example PO2:

```
<PurchaseOrder>
    <Reference>ABEL-20021127121040897PST</Reference>
    <Actions>
        <Action>
            <User>ZLOTKEY</User>
        </Action>
        <Action>
            <User>KING</User>
        </Action>
    </Actions>
    ...
</PurchaseOrder>
```

FIG. 1 illustrates one possible set of mappings 100 of the tag names in PO2 to binary XML tokens. FIG. 2 represents one possible representation of PO2 in binary XML stream form 200 using the mappings 100.

In the example of PO2 in binary XML stream form 200, each tag name in the original PO2 is replaced with the token to which it is mapped in the sample mappings 100. Because there are two instances of the "Action" type node, each instance is indicated first by the token to which the tag name "Action" is mapped, namely "4", and second, by the ordinal number of the particular instance of the "Action" node separated from the token "4" by an asterisk. Therefore, the first occurrence of "<Action>" in PO2 is replaced by "<4*0>" in the binary XML example 200 and the second is replaced by "<4*1>".

The Update Process

Figure 3:
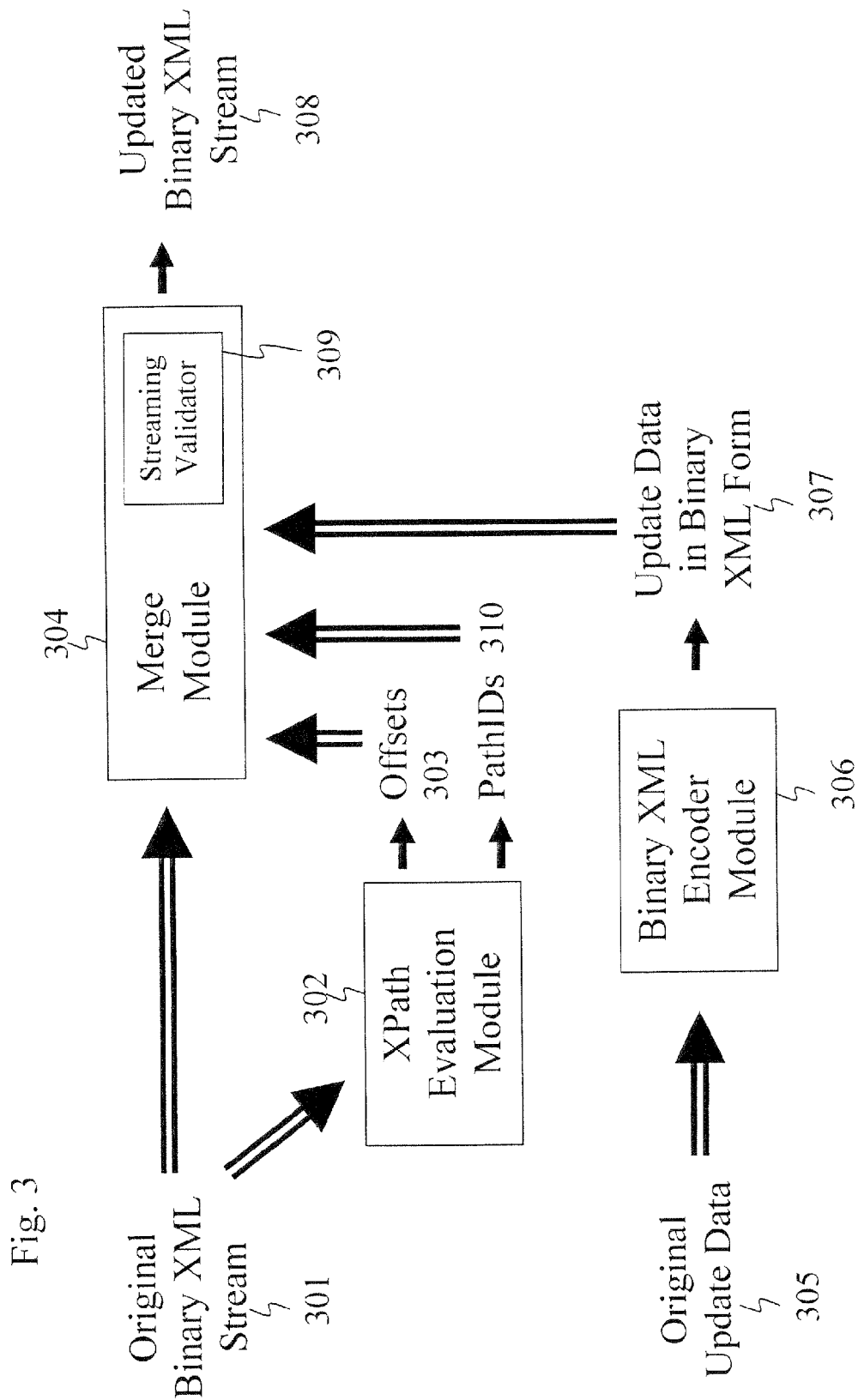
FIG. 3 is a block diagram of a system that updates and validates a stream of binary XML.

Regarding FIG. 3, the original binary XML stream 301 is analyzed to evaluate the positions of the target nodes by an XPath Evaluation Module 302. The beginning and end points of the target nodes are recorded as offsets 303 into the original binary XML stream 301 and are provided to a Merge Module 304. Also the update data 305 as provided by the SQL query is encoded into binary XML in the Binary XML Encoder Module 306. The Merge Module 304 collects the offsets 303 and the update data in binary XML form 307 and uses this information to update the original binary XML stream 301, which produces the updated binary XML stream 308. The updated binary XML stream 308 includes all updates to the XML document requested by the SQL query. The Streaming Validator 309 and the pathIDs 310 will be discussed hereafter.

The XPath Evaluation Module

In one embodiment, the XPath Evaluation Module 302 receives an XPath expression to identify the target nodes in the original binary XML stream 301. In another embodiment, the XPath Evaluation Module 302 also receives binary XML translation information relating to the original binary XML stream 301. The XPath Evaluation Module 302 uses the binary XML translation information to convert the information in the XPath expression into the same binary XML form as the original binary XML stream 301.

In yet another embodiment, the XPath Evaluation Module 302 builds a non-deterministic finite automaton ("NFA") using the information in the XPath expression. Such an NFA would typically include a start state, intermediate states, and a target state, and would have the ability to keep track of a "current state". Each state in the NFA, minus the start state, represents a node given in the location path of the XPath expression. The XPath Evaluation Module 302 initializes the NFA in the start state to indicate that no nodes represented in the XPath expression have been located.

Once the NFA is established, the XPath Evaluation Module 302 reads in the original binary XML stream 301. As the XPath Evaluation Module 302 reads in each part of the original binary XML stream 301, the parts of the stream 301 trigger events in the XPath Evaluation Module 302 that identify the nature of each part. For example, an event such as StartElement may be triggered in the XPath Evaluation Module 302 by the beginning of an XML node. Likewise, an event such as EndElement may be triggered in the XPath Evaluation Module 302 by the end of an XML node.

In one embodiment, the XPath Evaluation Module 302 uses the events triggered by the original binary XML stream 301 to control the current state of the NFA. A StartElement or EndElement event may cause the XPath Evaluation Module 302 to change the NFA's current state if the event corresponds to a state that neighbors the current state of the NFA.

In a further embodiment, the XPath Evaluation Module 302 reads in the entire original binary XML stream 301, monitoring each event triggered by the stream 301. Any event that causes the XPath Evaluation Module 302 to move the NFA into or away from a target state will also cause the Module 302 to record an offset 303 because if the NFA moves into a target state, the beginning of one of the target nodes has just been read by the XPath Evaluation Module 302 and if the NFA moves away from a target state, the end of a target node has been read. Once the entire original binary XML stream 301 has been read and the offset list 303 is complete, the list 303, which marks the beginnings and ends of all target nodes in the original binary XML stream 301, is passed to the Merge Module 304.

Taking PO2 as an example, the XPath Evaluation Module 302 gets the following XPath expression from the SQL query: "/PurchaseOrder/Actions/Action[1]/User". The XPath Evaluation Module 302 may convert the XPath expression into its binary XML format given the mappings 100 (FIG. 1): "/1/3/4*1/5".

Figure 4:
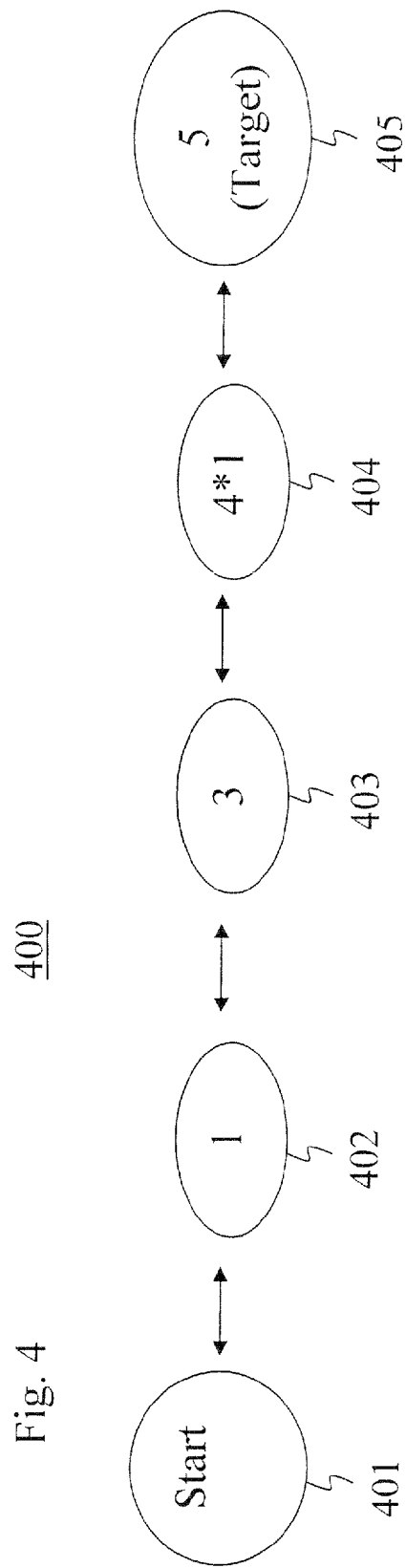
FIG. 4 is a block diagram that illustrates a non-deterministic finite automaton used by the system that updates the stream of binary XML.

The XPath Evaluation Module 302 may now convert the binary XPath expression into an NFA, an example of which is shown in FIG. 4. The NFA 400 consists of four states including (1) Start State 401, (2) Intermediate State "1" 402, (3) Intermediate State "3" 403, (4) Intermediate State "4*1" 404 and (4) Target State "5" 405. Again regarding FIG. 3, it will be apparent to one of skill in the art that the order of steps taken by the XPath Evaluation Module 302 to process the XPath expression into an NFA is immaterial. It will also be apparent to one of skill in the art that the techniques provided are independent of the form of the NFA.

As illustrated by FIG. 2, the original binary XML stream from PO2 200 may be the following: "<1 ><2>ABEL-20021127121040897PST</2><3><4*0><5>ZLOTKEY</5></4><4*1><5>KING</5></4> ... </1>".

Referring to both FIGS. 3 and 4, the NFA 400 built by the XPath Evaluation Module 302 will initialize in the Start State 401. Then the XPath Evaluation Module 302 will begin reading the binary XML form of PO2 200 (FIG. 2) because it is the original binary XML stream 301 in this example. The first tag that Module 302 reads is "<1>", which will trigger a StartElement event. Because the StartElement event is of type "1", it corresponds to the Intermediate State "1" 402 that neighbors the current state of the NFA 400 (the Start State 401). Therefore, the XPath Evaluation Module 302 will move the NFA 400 into the Intermediate State "1" 402.

The XPath Evaluation Module 302 will then read in the next tag of the binary XML stream of PO2 200 (FIG. 2), "<2>", which will trigger a StartElement event. This StartElement event will not cause the XPath Evaluation Module 302 to move the NFA 400 to another state because the event does not correspond to a state that neighbors the current state of the NFA 400, Intermediate State "1" 402.

The XPath Evaluation Module 302 will continue to read the binary XML stream of PO2 200 (FIG. 2) and respond to events it triggers until the end of the stream. As explained above, any event that causes the XPath Evaluation Module 302 to move the NFA 400 into or away from Target State "5" 405 will also cause the Module 302 to record an offset 303, marking the beginning or the end of a target node, respectively.

The Binary XML Encoder

As previously mentioned, the update data 305 as provided by the SQL query is encoded into binary XML form before it is merged into the original binary XML stream 301 by the Merge Module 304. The Binary XML Encoder Module 306 receives the original update data 305 as represented in the SQL query along with translation information relating to the binary XML form of the original binary XML stream 301. The Binary XML Encoder Module 306 uses the translation information to encode the original update data 305 into the same binary XML form as the original binary XML stream 301. The resulting update data in binary XML form 307 is then passed to the Merge Module 304.

The Merge Module

In one embodiment, the Merge Module 304 receives (1) the original binary XML stream 301, (2) the list of offsets 303 from the XPath Evaluation Module 302, and (3) the update data in binary XML form 307 from the Binary XML Encoder Module 306. The Merge Module 304 outputs the updated binary XML stream 308 which includes all of the changes directed by the SQL query.

In order to accomplish the needed updates to the original binary XML stream 301, the Merge Module 304 may perform insertions, deletions, or both simultaneously. No matter the manner of the required update, the Merge Module 304 will first copy the original binary XML stream 301 into the updated binary XML stream 308 until it reaches, in the original binary XML stream 301, the position of an offset in the list of offsets 303.

According to one embodiment, to perform an insertion at the offset position, the Merge Module 304 will copy the update data in binary XML form 307 into the updated binary XML stream 308. Then the Merge Module 304 will resume copying the information from the original binary XML stream 301 into the updated binary XML stream 308 until it comes to the position in the original binary XML stream 301 of another offset 303 that requires further action.

According to one embodiment, to perform a deletion at the offset position, the Merge Module 304 will cease to copy the information from the original binary XML stream 301 into the updated binary XML stream 308 from the position of the offset until the Merge Module 304 reaches, in the original binary XML stream 301, the position of a second offset in the list of offsets 303 indicating the end of the portion of the original binary XML stream 301 to be deleted. The Merge Module 304 will then resume copying the information from the original binary XML stream 301 into the updated binary XML stream 308 until it comes to the position in the original binary XML stream 301 of another offset 303 that requires further action.

In one embodiment, to perform both an insertion and a deletion simultaneously at the offset position, the Merge Module 304 will first copy the update data in binary XML form 307 into the updated binary XML stream 308 at the offset position. The Merge Module 304 will then omit from the updated binary XML stream 308 that information in the original binary XML stream 301 preceding a second offset in the list of offsets 303 indicating the end of the portion of the original binary XML stream 301 to be deleted. The Merge Module 304 will then resume copying the information from the original binary XML stream 301 into the updated binary XML stream 308 until it comes to the position in the original binary XML stream 301 of another offset 303 that requires further action.

It will be apparent to one of skill in the art that the techniques provided can be practiced using various algorithms in the Merge Module 304 designed to accomplish deletions and insertions of data regarding the binary XML stream.

Merge Examples

For one example of the merge process, assume that a user issues an updateXML command to update a text node with a new value. The XPath Evaluation Module 302 identifies two offsets in the source stream where the update needs to happen. Under these circumstances, the merge module 304 creates a new stream and starts copying the binary data from the beginning of the source stream to the first offset. The Merge Module 304 then writes the new value (also in binary form) following the first offset. If the first offset is represented by 'offset1' and the length of the old value by 'olen1', then following the new value, the Merge Module 304 copies the binary data beginning from (offset1+olen1) location in the source stream to the second offset. Following this, the new value is again written. The binary data is then copied, beginning from (offset2+olen2) location in the source stream to the end of the source stream.

As another example, assume that a user issues a deleteXML command to delete an element. The XPath Evaluation Module 302 identifies one offset in the source stream where this update needs to happen. The Merge Module 304 creates a new stream and starts copying the binary data from the beginning of the source stream to the offset. The Merge Module 304 then copies the binary data from (offset+old-length) location, until the end of the source stream.

Piece-Wise Validation

The updated binary XML stream 308 can be validated if the XML document has a known schema. The XML document has a known schema if the database server knows the XML schema to which the XML document conforms. The database server may "know" the schema, for example, if the schema has been registered with the database server.

On the other hand, XML data has no known schema if the database server does not know the schema to which the XML data conforms. Thus, unknown-schema XML includes both (1) XML documents that do not conform to any schema, and (2) XML documents that conform to an XML schema, but the XML schema is not known to the database server.

In FIG. 3, the Streaming Validator 309 is depicted as a part of the Merge Module 304. This arrangement is because validation occurs, in the illustrated embodiment, during the merging process. Merge Module 304 initiates validation of the newly updated portion of the updated binary XML stream 308 as soon as the update is accomplished. In one embodiment, validation of the updated XML stream 308 is mandatory for an XML document with a known schema if the finished updated binary XML stream 308 is to be saved back to the database. In one embodiment, users have the option of turning off validation if the updated binary XML stream 308 will not be saved back to the database.

In one embodiment, only those portions of the updated binary XML stream 308 affected by the update are validated. The Streaming Validator 309 implements streaming validation as described above. Specifically, the Streaming Validator 309 compares a snapshot of the XML data, formed by the events the XML data triggers, with the schema associated with the XML data. In one embodiment, to accomplish validation of the updated portions of the updated stream 308, the Streaming Validator 309 receives (1) the list of events generated by the portion of binary XML that was updated and (2) the schema definition of the nodes it is validating.

In order to compile the list of events generated by the updated portions of the updated binary XML stream 308, the Merge Module 304 records the offsets of the updated portions of the stream 308. The Merge Module 304 uses those offsets to record the events generated by the updated binary XML data within those offsets. These events are passed to the Streaming Validator 309.

Additionally, the Streaming Validator 309 requires the schema definitions of the nodes it is validating. At times, the schema definition of a node is apparent by comparing the element name to the global list of elements. However, other element definitions are not apparent from the global list of elements because, for example, the element is a local complex type or a type from a different namespace.

Therefore, the Streaming Validator 309 is given a pathID 310 for the nodes that were updated. These pathIDs 310 are generated by the XPath Evaluation Module 302 as it locates each instance of the target nodes. Each pathID 310 is unique to the path from the root node of the XML data to the node being evaluated and gives the exact context of that node. The Streaming Validator 309 can use the pathID 310 of a particular node to look up the schema definition of that node.

Once the Streaming Validator 309 has both the event list of a node and the schema definition of that node, it can validate the node. It will be apparent to one of skill in the art that if the updated node has a schema that includes an identity constraint, all of the nodes to which the identity constraint applies must also be validated in order to verify that all values used in that context are unique. For piecewise validation, complete identity constraints checking is not performed.

In another embodiment, the parent of the updated nodes are validated. In this embodiment, the Streaming Validator 309 receives the offsets of the parent node of the updated node as well as the schema definition or the path id of the child node or the updated node.

Piece-wise validation of XML data facilitates a gain in efficiency and resource availability, whether the validation is performed on only that portion of the updated binary XML stream 308 that was modified, or on the parent nodes of the modified XML data.

Hardware Overview

Figure 5:
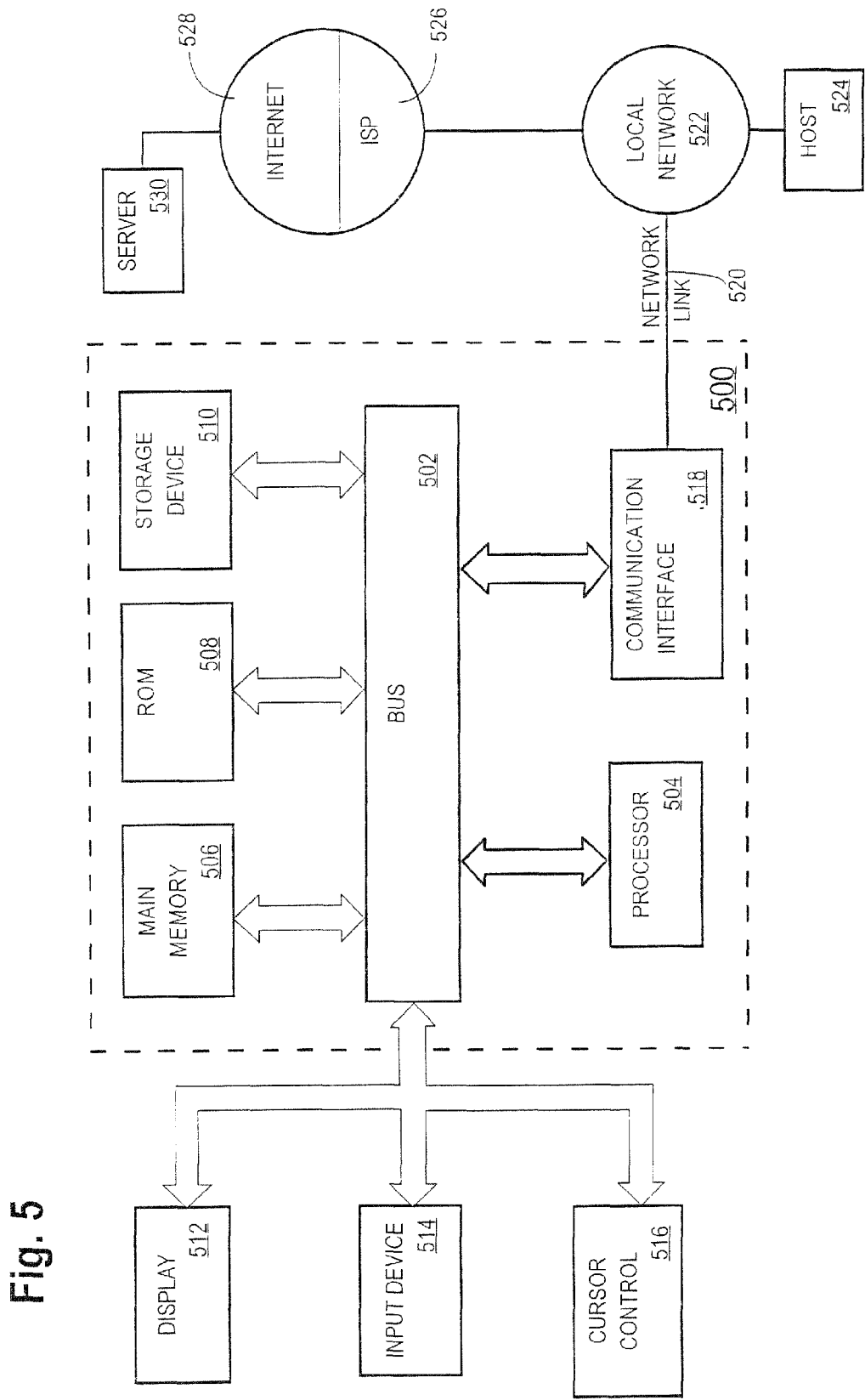
FIG. 5 is a block diagram of a computer system that may be used to implement embodiments of the invention.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM)

or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. In contrast, the term "storage medium" includes only non-transitory media, such as volatile and non-volatile media, and excludes transmission media such as signals. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-executed method for making a change to an XML document comprising the steps of:
   receiving a request to make a change to an XML document, the request including data that identifies a target XML node;
   reading the XML document into computer memory in the form of an original stream of XML data;
   calculating a first offset position into the original stream of XML data, the first offset position identifying a starting point of the target XML node in the original stream of XML data;
   calculating a second offset position into the original stream of XML data, the second offset position identifying an ending point of the target XML node in the original stream of XML data; and
   creating an updated stream of XML data, wherein creating the updated stream includes:
      copying data into the updated stream of XML data, from the original stream of XML data, starting at a beginning point in the original stream of XML data up to the first offset position; and
      after copying data into the updated stream of XML data, from the original stream of XML data, starting at the beginning point in the original stream of XML data up to the first offset position, performing the step of copying data into the updated stream of XML data, from the original stream of XML data, starting at the second offset position up to an ending point in the original stream of XML data;
   wherein the original stream of XML data is in binary XML form;
   wherein the updated stream of XML data is in binary XML form;
   wherein the method is performed by one or more computing devices.

2. The method of claim 1 wherein the request is for deletion of the target XML node.

3. The method of claim 1 wherein:
   said request is for an update of said target XML node;
   said request includes a new node value for said target XML node;
   the step of creating an updated stream of XML data includes copying the new node value into the updated stream of XML data at the first offset position; and
   the step of copying the new node value is
      performed after copying data into the updated stream of XML data from the original stream of XML data starting at the beginning point in the original stream of XML data up to the first offset position; and
      performed before copying data into the updated stream of XML data after the new node value from the original stream of XML data starting at the second offset position up to the ending point in the original stream of XML data.

4. The method of claim 3 wherein the new node value is in a string representation.

5. The method of claim 4, further comprising the step of converting the new node value from a string representation into a binary XML representation.

6. The method of claim 3 further comprising validating the updated stream of XML data against a schema, comprising the steps of:
   identifying a beginning position and an end position of a portion of the updated stream of XML data, the portion of the updated stream of XML data comprising a structure and a type;
   wherein the portion of the updated stream of XML data is less than all of the updated stream of XML data;
   recording the structure of only the portion of the updated stream of XML data; and
   comparing the structure of only the portion of the updated stream of XML data to a schema definition of the type of the portion of the updated stream of XML data.

7. The method of claim 6 wherein the structure of the portion of the updated stream of XML data further comprises a set of events.

8. The method of claim 7 wherein the set of events comprise at least one of:
   a start element event,
   an end element event,
   an attribute event,
   an attribute value event, or
   a node value event.

9. The method of claim 6 wherein the portion of the updated stream of XML data comprises the new node value copied into the updated stream of XML data.

10. The method of claim 9 wherein the portion of the updated stream of XML data further comprises a set of nodes to which an identity constraint in the schema applies.

11. The method of claim 6 wherein the portion of the updated stream of XML data comprises a parent node to the new node value copied into the updated stream of XML data.

12. The method of claim 11 wherein the portion of the updated stream of XML data further comprises a set of nodes to which an identity constraint in the schema applies.

13. The method of claim 1 wherein the step of reading the XML document into computer memory includes reading the XML document from a relational structure within a relational database.

14. The method of claim 13 wherein the XML document is stored in the relational database in binary XML form.

15. The method of claim 1 wherein calculating the second offset position into the original stream of XML data comprises the step of calculating a length of a value of the target XML node in the original stream of XML data and adding the length of the value of the target XML node to the first offset position.

16. The method of claim 1 wherein the data that identifies identifier of the target XML node comprises an XPath expression.

17. A machine-executed method for making a change to an XML document comprising the steps of:
   receiving a request to add a new node value as a new node of an XML document, the request including data that identifies a target XML node and the new node value;
   reading the XML document into computer memory in the form of an original stream of XML data;
   calculating an offset position into the original stream of XML data based on the data that identifies the target XML node; and
   creating an updated stream of XML data, wherein creating the updated stream includes:
      copying data into the updated stream of XML data, from the original stream of XML data, starting at a beginning point in the original stream of XML data up to the offset position;
      after copying data into the updated stream of XML data, from the original stream of XML data, starting at the beginning point in the original stream of XML data up to the offset position, performing the step of copying the new node value into the updated stream of XML data at the offset position; and after copying the new node value into the updated stream of XML data, performing the step of copying data into the updated stream of XML data, from the original stream of XML data, starting at the offset position up to an ending point in the original stream of XML data;

wherein the original stream of XML data is in binary XML form;

wherein the updated stream of XML data is in binary XML form;

wherein the method is performed by one or more computing devices.

18. The method of claim 17 further comprising validating the updated stream of XML data against a schema, wherein the step of validating further comprises the steps of:

identifying a beginning position and an end position of a portion of the updated stream of XML data, the portion of the updated stream of XML data comprising a structure and a type;

wherein the portion of the updated stream of XML data is less than all of the updated stream of XML data and comprises the new node value copied into the updated stream of XML data;

recording the structure of only the portion of the updated stream of XML data; and comparing the structure of only the portion of the updated stream of XML data to a schema definition of the type of the portion of the updated stream of XML data.

19. A machine-executed method for updating an XML document comprising the steps of:

receiving a request to update an XML document stored in a database in binary XML format, the request to update comprising:
an identifier of the XML document;
an XPath expression defining a target XML node; and
a string representation of a new node value;

reading the XML document from the database into computer memory in the form of an original stream of XML;

calculating a first offset position into the original stream of XML, the first offset position identifying a starting point of the target XML node in the original stream of XML;

calculating a second offset position into the original stream of XML, the second offset position identifying an ending point of the target XML node in the original stream of XML;

encoding the string representation of the new node value into a binary XML representation of the new node value;

creating an updated stream of binary XML, wherein creating the updated stream of binary XML includes:
copying binary XML into the updated stream of binary XML from the original stream of XML starting at a beginning point in the original stream of XML up to the first offset position;
copying the binary XML representation of the new node value into the updated stream of binary XML at the first offset position; and
copying binary XML into the updated stream of binary XML after the new node value from the original stream of XML starting at the second offset position up to an ending point in the original stream of XML; and validating the updated stream of binary XML, wherein validating the updated stream of binary XML includes:
identifying a beginning position and an end position of a portion of the updated stream of binary XML, the portion of the updated stream of binary XML comprising a structure and a type;
recording the structure of the portion of the updated stream of binary XML; and
comparing the structure of the portion of the updated stream of binary XML to a schema definition of the type of the portion of the updated stream of binary XML.

20. A computer-readable storage medium storing instructions for making a change to an XML document, the instructions including instructions for:

receiving a request to make a change to an XML document, the request including data that identifies a target XML node;

reading the XML document into computer memory in the form of an original stream of XML data;

calculating a first offset position into the original stream of XML data, the first offset position identifying a starting point of the target XML node in the original stream of XML data;

calculating a second offset position into the original stream of XML data, the second offset position identifying an ending point of the target XML node in the original stream of XML data; and creating an updated stream of XML data, wherein creating the updated stream includes:
copying data into the updated stream of XML data, from the original stream of XML data, starting at a beginning point in the original stream of XML data up to the first offset position; and
after copying data into the updated stream of XML data, from the original stream of XML data, starting at the beginning point in the original stream of XML data up to the first offset position, performing the step of copying data into the updated stream of XML data, from the original stream of XML data, starting at the second offset position up to an ending point in the original stream of XML data;

wherein the original stream of XML data is in binary XML form;

wherein the updated stream of XML data is in binary XML form.

21. The computer-readable storage medium of claim 20 wherein the request is for deletion of the target XML node.

22. The computer-readable storage medium of claim 20 wherein:

said request is for an update of said target XML node;
said request includes a new node value for said target XML node;
the step of creating an updated stream of XML data includes copying the new node value into the updated stream of XML data at the first offset position; and
the step of copying the new node value is
performed after copying data into the updated stream of XML data from the original stream of XML data starting at the beginning point in the original stream of XML data up to the first offset position; and
performed before copying data into the updated stream of XML data after the new node value from the original stream of XML data starting at the second offset position up to the ending point in the original stream of XML data.

23. The computer-readable storage medium of claim 22 wherein the instructions further include instructions for validating the updated stream of XML data against a schema, further comprising:

identifying a beginning position and an end position of a portion of the updated stream of XML data, the portion of the updated stream of XML data comprising a structure and a type;
wherein the portion of the updated stream of XML data is less than all of the updated stream of XML data;
recording the structure of only the portion of the updated stream of XML data; and
comparing the structure of only the portion of the updated stream of XML data to a schema definition of the type of the portion of the updated stream of XML data.

24. A computer-readable storage medium storing instructions for making a change to an XML document, the instructions including instructions for:
receiving a request to add a new node value as a new node of an XML document, the request including data that identifies a target XML node and the new node value;
reading the XML document into computer memory in the form of an original stream of XML data;
calculating an offset position into the original stream of XML data based on the data that identifies the target XML node; and
creating an updated stream of XML data, wherein creating the updated stream includes:
copying data into the updated stream of XML data, from the original stream of XML data, starting at a beginning point in the original stream of XML data up to the offset position;
after copying data into the updated stream of XML data, from the original stream of XML data, starting at the beginning point in the original stream of XML data up to the offset position, copying the new node value into the updated stream of XML data at the offset position; and
after copying the new node value into the updated stream of XML data, performing the step of copying data into the updated stream of XML data, from the original stream of XML data, starting at the offset position up to an ending point in the original stream of XML data;
wherein the original stream of XML data is in binary XML form;
wherein the updated stream of XML data is in binary XML form.

* * * * *

UNITED STATES PATENT AND TRADEMARK OFFICE
CERTIFICATE OF CORRECTION

| | | |
|---|---|---|
| PATENT NO. | : 7,831,540 B2 | Page 1 of 1 |
| APPLICATION NO. | : 11/924556 | |
| DATED | : November 9, 2010 | |
| INVENTOR(S) | : Vijay Medi et al. | |

It is certified that error appears in the above-identified patent and that said Letters Patent is hereby corrected as shown below:

In column 14, line 47, in claim 16, before "the" delete "identifier of".

Signed and Sealed this
Second Day of August, 2011

David J. Kappos
*Director of the United States Patent and Trademark Office*